United States Patent [19]

Inhofe, Jr.

[11] Patent Number: 5,476,562
[45] Date of Patent: Dec. 19, 1995

[54] LARGE DIAMETER ELECTRICALLY FUSIBLE PIPE METHODS

[75] Inventor: James A. Inhofe, Jr., Sapulpa, Okla.

[73] Assignee: Central Plastics Company, Shawnee, Okla.

[21] Appl. No.: 348,761

[22] Filed: Dec. 2, 1994

Related U.S. Application Data

[63] Continuation of Ser. No. 96,453, Jul. 26, 1993, abandoned, which is a continuation of Ser. No. 4,789, Jan. 14, 1993, Pat. No. 5,252,157, which is a continuation of Ser. No. 866,297, Apr. 13, 1992, abandoned, which is a continuation of Ser. No. 594,047, Nov. 1, 1990, abandoned, which is a division of Ser. No. 345,455, May 1, 1989, abandoned.

[51] Int. Cl.⁶ .................................................. B32B 31/00
[52] U.S. Cl. ........................... 156/156; 156/171; 156/172; 156/173; 156/195; 156/244.13; 156/274.2; 156/308.2; 138/144; 138/153; 138/174
[58] Field of Search ........................ 156/156, 171, 156/172, 173, 195, 244.13, 274.2, 308.2; 138/144, 153, 174

[56] References Cited

U.S. PATENT DOCUMENTS

| | | | |
|---|---|---|---|
| 2,398,876 | 4/1946 | Bailey | 18/19 |
| 2,722,263 | 11/1955 | Beare | 156/244.12 |
| 3,118,800 | 1/1964 | Snelling | 156/244.12 |
| 3,271,064 | 9/1966 | Hall | 156/143 |
| 3,378,672 | 4/1968 | Blumenkranz | 156/158 |
| 3,477,891 | 11/1969 | Hawerkamp | 156/143 |
| 3,607,501 | 9/1971 | Okumura | 156/195 |
| 3,890,181 | 6/1975 | Stent et al. | 156/195 |
| 3,919,026 | 11/1975 | Mizutani | 156/244.12 |
| 3,943,334 | 3/1976 | Sturm | 219/544 |
| 3,969,170 | 7/1976 | Landgraf | 285/21 |
| 3,987,276 | 10/1976 | Vogelsanger et al. | 156/274.2 X |
| 4,010,054 | 3/1977 | Bradt | 156/173 |
| 4,117,311 | 9/1978 | Sturm | 219/544 |
| 4,174,984 | 11/1979 | Meadows | 156/143 |
| 4,305,899 | 12/1981 | Van Dongeren | 264/25 |
| 4,319,944 | 3/1982 | Pope | 156/195 |
| 4,365,144 | 12/1982 | Reich et al. | 219/535 |
| 4,368,088 | 1/1983 | Asakura et al. | 156/143 |
| 4,436,987 | 3/1984 | Thalmann et al. | 219/544 |
| 4,575,400 | 3/1986 | Ueda et al. | 156/428 |
| 4,634,844 | 1/1987 | Lodder et al. | 219/544 |
| 4,695,335 | 9/1987 | Lyall | 156/274.2 X |
| 4,770,442 | 9/1988 | Sichler | 156/273.9 |
| 4,813,718 | 3/1989 | Matter et al. | 285/419 X |
| 4,842,305 | 6/1989 | Kistenich et al. | 156/274.2 X |
| 4,906,313 | 3/1990 | Hill | 156/274.2 X |
| 5,071,506 | 12/1991 | Nelson et al. | 156/433 |
| 5,086,213 | 2/1992 | Nussbaum et al. | 156/274.2 X |
| 5,104,159 | 4/1992 | Sugiyama et al. | 285/419 X |
| 5,252,157 | 10/1993 | Inhofe, Jr. | 156/158 |

FOREIGN PATENT DOCUMENTS

| | | | |
|---|---|---|---|
| 0217080 | 11/1956 | Australia | 219/544 |
| 1071433 | 12/1959 | Germany | 285/21 |
| 161116 | of 0000 | Japan | 156/274.2 |
| 1121850 | 7/1968 | United Kingdom | 219/535 |

*Primary Examiner*—Chester T. Barry
*Attorney, Agent, or Firm*—Dougherty, Hessin, Beavers & Gilbert

[57] ABSTRACT

Methods of producing electrically fusable sleeve connectors for connecting large diameter thermoplastic pipe sections and the sleeve connectors produced by such methods are provided. Methods of sealingly connecting adjacent ends of a pair of large diameter thermoplastic pipe sections by electric fusion are also provided. The methods of producing electrically fusable thermoplastic sleeve connectors broadly include the steps of winding a tape of molten thermoplastic material onto a large diameter core drum whereby adjacent windings are fused and upon being cooled a solid sleeve is formed, embedding an electric resistance heating wire in a surface of the sleeve while the thermoplastic material is still in the molten state and removing the sleeve after cooling with electric resistance heating wire embedded therein from the core drum.

5 Claims, 3 Drawing Sheets

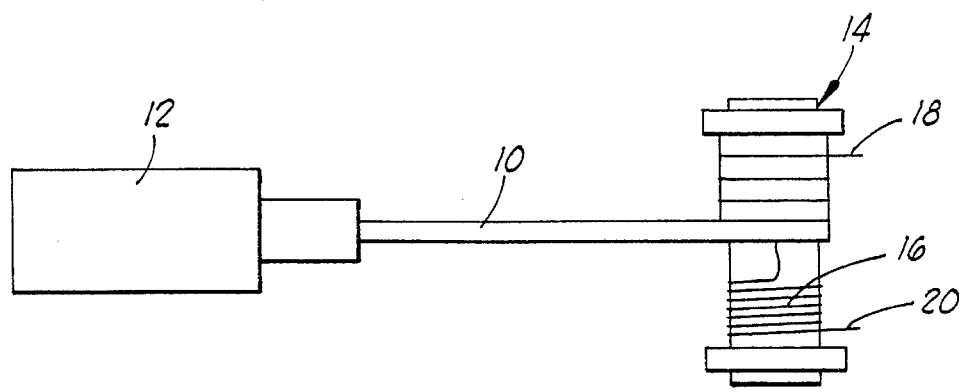
FIG. 1
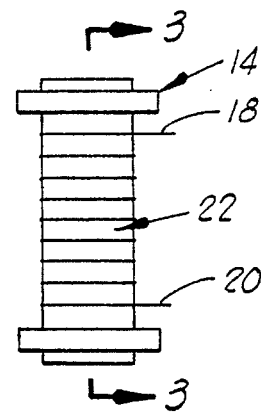
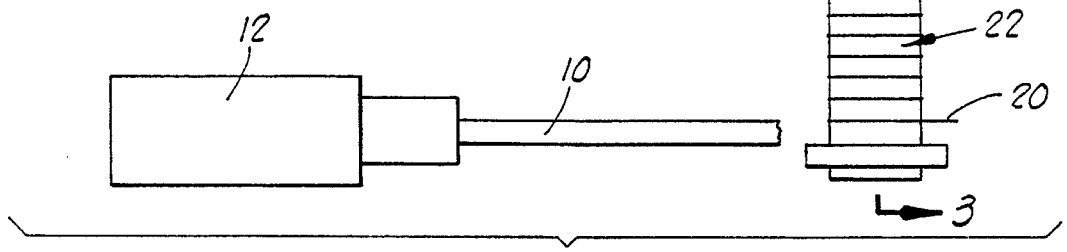
FIG. 2
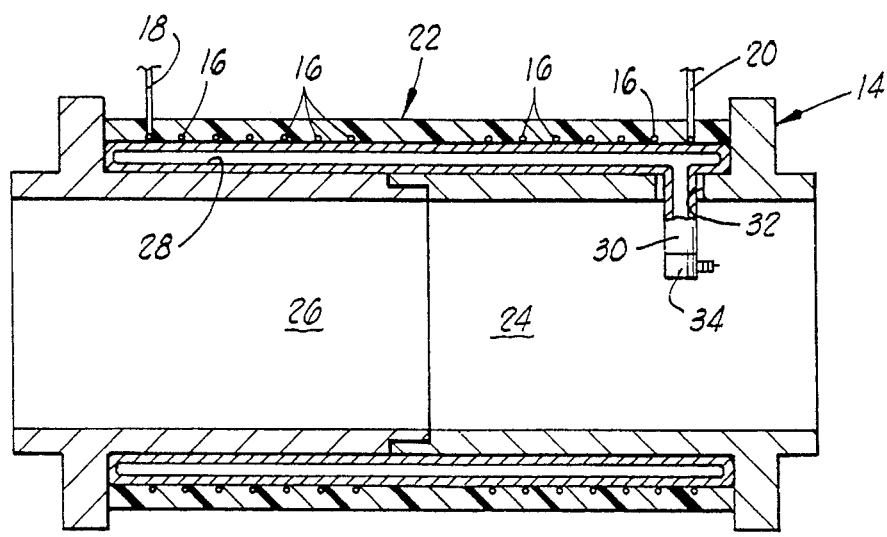
FIG. 3

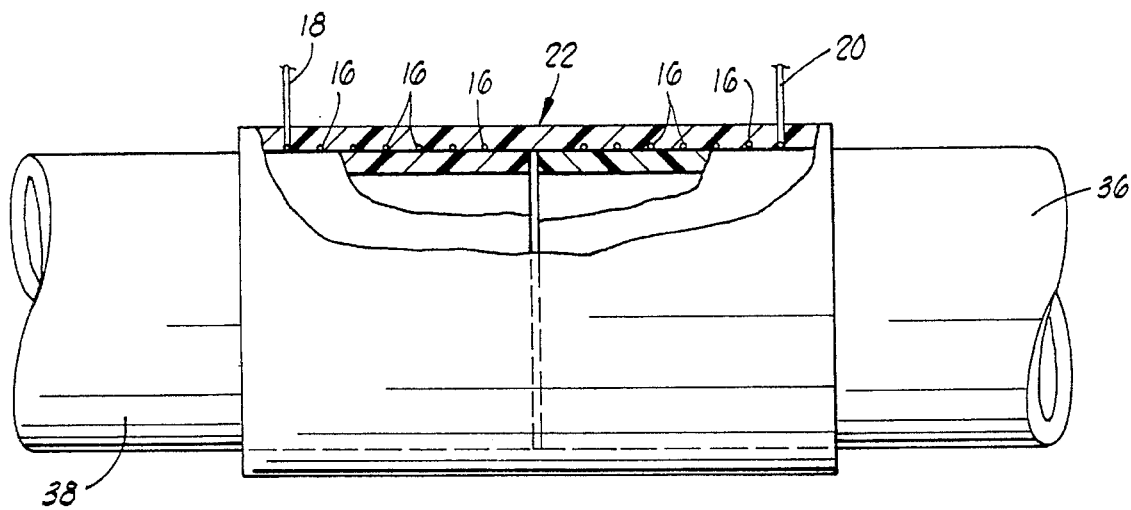
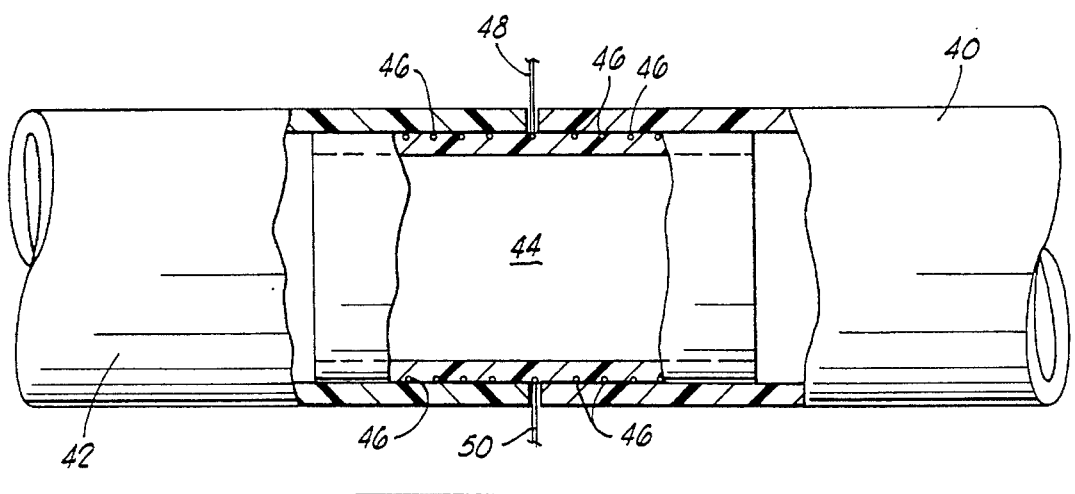
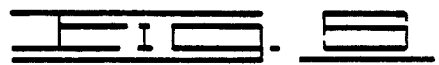

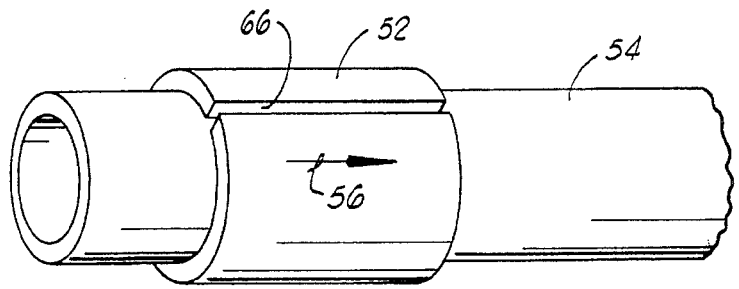
FIG. 6
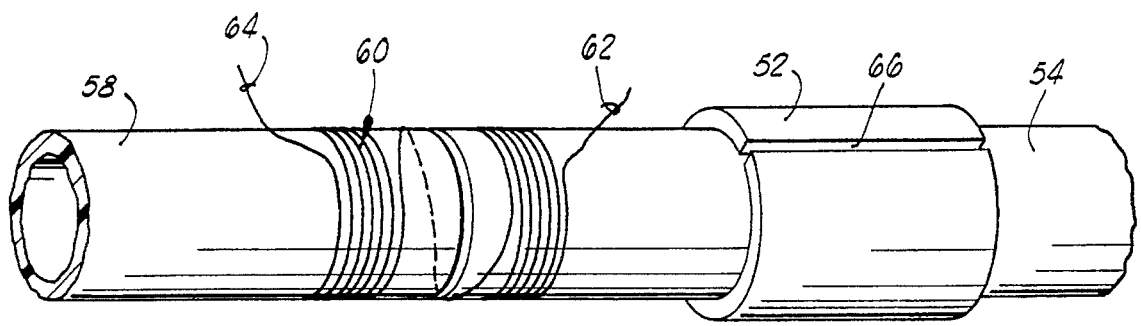
FIG. 7
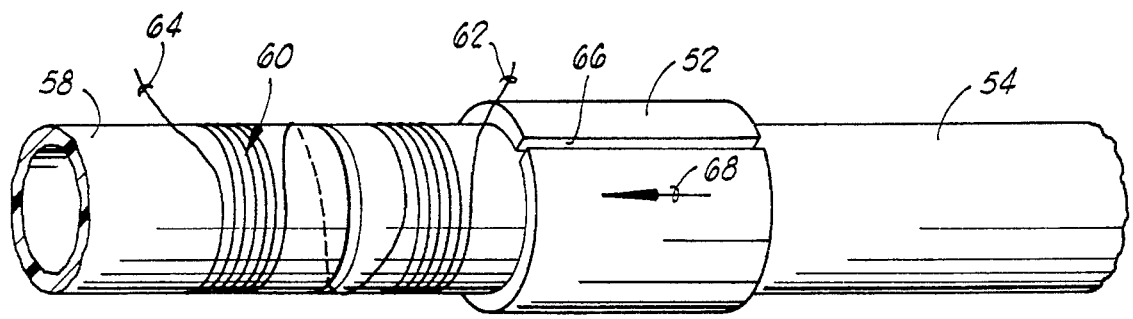
FIG. 8
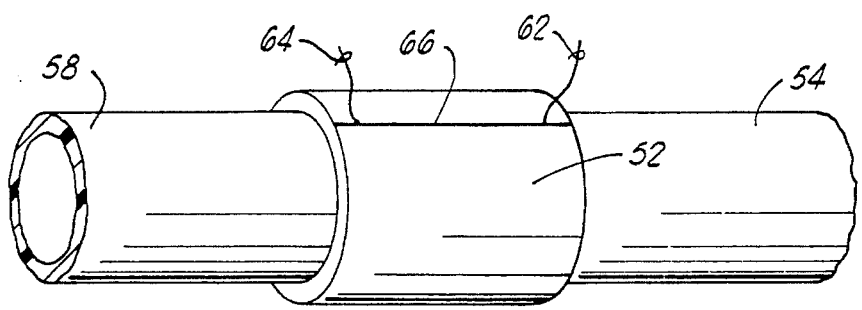
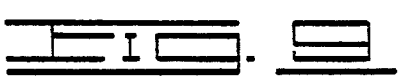
FIG. 9

LARGE DIAMETER ELECTRICALLY FUSIBLE PIPE METHODS

This is a continuation of application Ser. No. 08/096,453 filed on Jul. 26, 1993, now abandoned, which is a continuation of application Ser. No. 08/004,789 filed on Jan. 14, 1993, now U.S. Pat. No. 5,252,157, which is a continuation of application Ser. No. 07/866,297 filed on Apr. 13, 1992, now abandoned, which is a continuation of application Ser. No. 07/594,047 filed on Nov. 1, 1990, now abandoned, which is a division of application Ser. No. 07/345,455, filed on May 1, 1989, now abandoned.

BACKGROUND OF THE INVENTION

1. Field of the Invention

The present invention relates to large diameter electrically fusible thermoplastic pipe connectors, methods of producing such connectors and methods of sealingly connecting adjacent ends of large diameter thermoplastic pipe sections by electric fusion.

2. Description of the Prior Art

Various extrusion and molding methods have been developed and used heretofore for producing large diameter pipe from thermoplastic materials. A number of such methods include the steps of wrapping extruded plastic in the molten state about a form or mandrel so that adjoining edges and surfaces of the tape are fused. Upon removing the wrapped thermoplastic material when cooled from the mandrel a solid tubular pipe or product is formed.

Large diameter pipe formed of thermoplastic material is finding increased acceptance in applications such as large water and sewer lines due to the excellent deterioration resistance, light weight and substantially unlimited service of such pipe. However, because of the large diameter of the pipe, sealingly connecting the ends of adjacent pipe sections has heretofore been burdensome and expensive.

By the present invention, electrically fusible thermoplastic sleeve connectors for connecting large diameter thermoplastic pipe sections, methods of producing such electrically fusible sleeve connectors and methods of sealingly connecting adjacent ends of large diameter thermoplastic pipe sections utilizing electric heat fusion are provided. The electrically fusible thermoplastic sleeve connectors and methods of the present invention make the use of large diameter thermoplastic pipe sections more economical and practical.

SUMMARY OF THE INVENTION

In one aspect of the present invention, methods of producing electrically fusible thermoplastic sleeve connectors for connecting the ends of large diameter thermoplastic pipe sections are provided. The methods basically comprise the steps of winding a tape of molten thermoplastic material onto a core drum whereby adjacent windings are fused and when cooled a solid sleeve is formed, embedding at least one electric resistance heating wire in a surface of the sleeve while the thermoplastic material is in the molten state, and after cooling removing the sleeve with electric resistance heating wire embedded therein from the core drum.

The electric resistance heating wire can be placed on the core drum prior to winding the tape of thermoplastic material thereon whereby the wire is embedded in the internal surface of the resulting sleeve. Alternatively, the electric resistance heating wire can be wound onto the external surface of the sleeve while the thermoplastic material thereof is in the molten state so that the wire is embedded in the external surface of the sleeve.

In another aspect of the present invention, electrically fusible large diameter plastic sleeve connectors produced in accordance with the above-described method are provided. The connectors can be utilized to sealingly connect adjacent ends of large diameter thermoplastic pipe sections either on the outsides of the pipe sections or on the insides of the pipe sections.

Finally, in yet another aspect of the present invention, methods of sealingly connecting adjacent ends of a pair of large diameter thermoplastic pipe sections by electric fusion are provided. The methods basically comprise the first step of moving a large diameter thermoplastic sleeve connector over the end and a distance down the length of a first of the pipe sections. The second pipe section is then placed in alignment with the first pipe section whereby an end of the second pipe section is positioned adjacent an end of the first pipe section. An electric resistance heating wire is wrapped around the external surfaces of the pipe sections next to the adjacent ends thereof, and the sleeve connector is moved to a position over the adjacent ends of the pipe sections and over the electric resistance heating wire. Finally, an electric current is applied to the electric resistance heating wire for a period of time such that the thermoplastic materials making up adjacent portions of the sleeve and pipe sections are sealingly fused together.

In a preferred embodiment, the large diameter sleeve connector includes a longitudinal split formed therein whereby the internal diameter of the sleeve can be enlarged by spreading the faces of the split apart. Also, the faces of the split can be shaved to reduce the internal diameter of the sleeve connector if required by variations in the external diameter of the pipe sections to be connected. The faces of the split can be fused together prior to electrically fusing the sleeve to the pipe sections utilizing either heating iron butt fusion techniques or electrofusion techniques. When the faces of the split are fused together electrically, such fusion can be carried out before or simultaneously with the fusion of the sleeve to the pipe sections.

It is, therefore, an object of the present invention to provide large diameter electrically fusible pipe connectors and methods of producing such connectors.

A further object of the present invention is the provision of methods of sealingly connecting adjacent ends of large diameter thermoplastic pipe sections by electric fusion.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a schematic illustration of apparatus for carrying out the method of producing electrically fusible thermoplastic sleeve connectors of the present invention.

FIG. 2 is a schematic illustration of the apparatus of FIG. 1 in a different mode of operation.

FIG. 3 is a cross-sectional view taken along line 3—3 of FIG. 2.

FIG. 4 is a side elevational view, partially in cross section, illustrating a pair of pipe sections with a sleeve connector of the present invention positioned thereon.

FIG. 5 is a side elevational view, partially in cross section, of a pair of pipe sections having an alternate form of sleeve connector of the present invention positioned thereon.

FIG. 6 is a side elevational view of a large diameter thermoplastic pipe section having a split sleeve connector disposed thereon.

FIG. 7 is a side elevational view illustrating the pipe section of FIG. 6 after a second pipe section has been aligned therewith and an electric resistance heating wire has been wound on the end portions of the pipe sections.

FIG. 8 illustrates the pipe sections of FIG. 7 during the movement of the split sleeve connector towards a position over the adjacent ends of the pipe sections.

FIG. 9 illustrates the pipe sections of FIG. 8 after the sleeve connector has been positioned over the adjacent ends of the pipe sections and the faces of the split in the connector have been fused.

DESCRIPTION OF PREFERRED EMBODIMENTS

In one aspect of the present invention, methods of producing electrically fusible thermoplastic sleeve connectors for sealingly connecting adjacent ends of large diameter thermoplastic pipe sections are provided. In accordance with the methods, and referring to FIG. 1 of the drawings, a tape of molten thermoplastic material 10 extruded from an extruder 12 is wound onto a large diameter core drum 14. The extrusion of the continuous tape 10 of molten thermoplastic material by means of the extruder apparatus 12 is well known in the art. The thermoplastic material utilized can be any of a variety of heretofore used thermoplastic compositions which melt and are moldable at relatively low temperatures, and when cooled, form high strength, corrosion resistant durable objects. Such thermoplastic compositions are comprised of organic polymer resins and various additives such as plasticizers, mold release agents, corrosion inhibitors, etc. Thermoplastic materials which are particularly suitable for use in accordance with the present invention are those containing polyolefin resins such as polyethylene and polybutylene.

As illustrated in FIG. 1, a continuous length of the tape 10 of molten thermoplastic material is wound onto the large diameter core drum 14 whereby adjacent edges of each winding are fused. In the embodiment illustrated, a continuous length of an electric resistance heating wire 16 is placed on the drum 14 prior to winding the molten thermoplastic material thereon. While various kinds of wire can be utilized, an example of a typical electric resistance heating wire 16 is copper wire having a diameter in the range of from about 0.4 mm to about 3 mm. The opposite ends 18 and 20 of the wire 16 extend outwardly and are passed between adjacent thermoplastic material windings so that they extend to the exterior of the sleeve 22 formed on the drum 14 as illustrated in FIG. 2.

As will be understood, one or multiple layers of the molten thermoplastic material can be wound onto the core drum 14 whereby adjacent edges and other contacting surfaces of the windings are fused. Upon completion of the winding process as illustrated in FIG. 2, the tape is severed and the formed sleeve connector 22 is allowed to cool on the core drum 14.

The winding of the molten thermoplastic material onto the drum 14 causes the heating wire to be embedded in the thermoplastic material adjacent the interior surface of the sleeve 22. When it is desirable to produce a sleeve connector having electric resistance heating wire embedded therein adjacent the external surface thereof, the tape 10 of molten thermoplastic material is first wound onto the core drum 14 followed by the winding of heating wire on the external surface of the formed sleeve 22 whereby the heating wire is embedded therein. As will be understood, the core drum 14 can be heated if required to maintain the thermoplastic material in the molten state while the electric resistance heating wire is wound thereon and/or to facilitate the fusing of multiple tape layers. The terms "embedded" or "embedding" are used herein to mean the placement of an electric resistance heating wire within and adjacent a surface of a sleeve connector.

Referring now to FIG. 3, the large diameter core drum 14 with the formed thermoplastic sleeve connector 22 thereon is illustrated in detail. While the drum 14 can take any convenient form it must be subject to disassembly to the extent required for the formed sleeve connector 22 to be removed therefrom. In the form illustrated in FIG. 3, the drum 14 is comprised of two opposing cylindrical parts 24 and 26 which can be assembled to form the cylindrical core drum 14 as shown. Disposed around the exterior surface of the core drum 14 is an inflated bladder 28 formed of flexible material. The exterior surface of the bladder 28 forms the winding surface on which the sleeve 22 with electric resistance heating wire embedded therein is formed. An inflating or deflating nozzle portion 30 of the bladder 28 extends through an opening 32 in the part 24 of the core drum 14. A valve 34 is connected to the nozzle 30 within the interior of the core drum 14.

In removing the formed sleeve connector 22 from the core drum 14, the bladder 28 is deflated by opening the valve 34. Once the bladder 28 has been deflated to the required extent, the part 26 of the core drum 14 is withdrawn from within the bladder 28 and removed. The formed and cooled sleeve connector 22 is then also removed from the bladder 28.

Referring now to FIG. 4, the electrically fusible sleeve connector 22 is illustrated positioned over the adjacent aligned ends of a pair of thermoplastic pipe sections 36 and 38. The electric resistance wire 16 is embedded in the sleeve connector 22 adjacent the internal surface thereof, and therefore the heating wire 16 lies adjacent the external surfaces of the end portions of the pipe sections 36 and 38. In order to sealingly connect the pipe sections 36 and 38 to the sleeve connector 22 an electric current is applied to the heating wire 16 by way of the ends 18 and 20 for a period of time such that the thermoplastic materials making up adjacent portions of the sleeve connector 22 and pipe sections 36 and 38 are sealingly fused together.

Referring now to FIG. 5, a pair of large diameter thermoplastic pipe sections 40 and 42 are illustrated positioned end-to-end. A sleeve connector 44 is disposed within the adjacent end portions of the pipe sections 40 and 42. The sleeve connector 44 includes electric resistance-heating wire 46 embedded within the exterior surface thereof, and the opposite ends 48 and 50 of the wire 46 extend from the sleeve connector 44 between the ends of the pipe sections 40 and 42 to the exterior of the pipe sections. The sleeve connector 44 is fused to the pipe sections 40 and 42 by applying an electric current to the electric resistance heating wire by way of the ends 48 and 50.

In another aspect of the present invention, methods of sealingly connecting adjacent ends of a pair of large diameter thermoplastic pipe sections by electric fusion are provided. The methods utilize a thermoplastic sleeve connector which does not include electric resistance heating wire embedded therein. Instead, the heating wire is wound on the external surfaces of the end portions of the pipe sections to be connected.

Referring to FIGS. 6–9, and particularly FIG. 6 thermoplastic sleeve connector 52 is placed over the end of a pipe section 54 and moved a distance in the direction of the arrow 56 down the length of the pipe section 54. As shown in FIG. 7, a second pipe section 58 is then positioned with an end thereof adjacent the end of the pipe section 54, and an electric resistance heating wire 60 is wound onto the end portions of the pipe sections 54 and 58 next to the adjacent ends thereof. Opposite end portions 62 and 64 of the heating wire 60 extend outwardly from the external surfaces of the pipe sections 54 and 58, respectively.

As shown in FIGS. 6 and 7, the sleeve connector 52 includes a longitudinal split 66 formed therein whereby the internal diameter of the connector 52 can be made larger by spreading the faces of the split 66 apart. This ability to enlarge the internal size of the sleeve connector 52 facilitates its movement on the pipe sections 54 and 58.

Referring now to FIG. 8, the sleeve connector 52 is next moved in the direction of the arrow 68 to the position illustrated in FIG. 9, i.e., to a position whereby the sleeve connector 52 is over the adjacent ends of the pipe sections 54 and 58 and over the electrical resistance heating wire 60 wound on the pipe sections. Once properly positioned, the end portions 62 and 64 of the heating wire 60 are passed through the split 66 of the connector 52 and the faces of the split 66 are moved together and fused using known butt fusing or electrofusion apparatus and techniques. In order to sealingly connect the adjacent ends of the pipe sections 54 and 58 to the sleeve connector 52, an electric current is applied to the heating wire 60 by way of the end portions 62 and 64 thereof for a period of time sufficient for the thermoplastic materials making up adjacent portions of the sleeve connector 52 and pipe sections 54 and 58 to be fused together.

In order to further illustrate the methods and Sleeve connectors of the present invention, the following examples are given.

EXAMPLE 1

A continuous molten tape of polyethylene thermoplastic material is extruded having cross-sectional dimensions of about 125 mm×3 mm. The molten tape is wound on a core drum having an external inflatable bladder winding surface of about 24 inches in diameter and having about 100 feet of about 2 mm diameter electric resistance heating wire wound thereon. The tape of thermoplastic material in the molten state is wound on the core drum in multiple layers whereby adjacent edges of the tape are fused, and a sleeve connector having an internal diameter of about 24 inches, an external diameter of about 26 inches, and about 14 windings of electric heating resistance wire embedded therein adjacent the internal surface thereof is formed. After cooling whereby the sleeve connector is solidified, the connector is removed from the core drum.

EXAMPLE 2

A connector produced as described above is used to sealingly connect adjacent ends of a pair of 24-inch O.D. thermoplastic pipe sections formed of polyethylene thermoplastic material. Once positioned over the adjacent end portions of the pipe sections, an electric current is applied to the heating wire in a known manner whereby the thermoplastic materials making up adjacent portions of the sleeve connector and pipe sections are sealingly fused together.

EXAMPLE 3

Thermoplastic pipe sections having external diameters of about 24 inches are sealingly connected by electric fusion as follows. A thermoplastic sleeve connector of about 24 inches inside diameter, about 26 inches outside diameter and a length of about 2 feet is placed over the end of one of the pipe sections and moved a distance down the length thereof. The sleeve connector includes a longitudinal split formed therein. The second pipe section is placed in alignment with the first pipe section whereby an end of the first pipe section is positioned adjacent an end of the second pipe section. A 100-foot length of about 2 mm diameter copper electric resistance heating wire is wrapped around the external surfaces of the pipe sections next to the adjacent ends thereof. The sleeve connector is moved over the adjacent ends of the pipe sections and over the heating wire wrapped thereon. The opposite end portions of the heating wire are passed through the split in the connector. The faces of the split in the connector are fused together using heating irons and an electric current is applied to the resistance heating wire by way of the ends thereof in a Known manner whereby the thermoplastic materials making up adjacent portions of the sleeve connector and pipe sections are sealingly fused together.

Thus, the present invention is well adapted to carry out the objects and attain the ends and advantages mentioned as well as those inherent therein. While presently preferred embodiments of the invention have been described for purposes of disclosure, numerous changes in the arrangements of steps and components can be made by those skilled in the art, which changes are encompassed within the spirit of this invention as defined by the appended claims.

What is claimed is:

1. A method of producing an electrically fusible solid thermoplastic sleeve connector for longitudinally connecting large diameter thermoplastic pipe sections comprising the steps of:

(a) extruding a tape of molten thermoplastic material;

(b) winding said tape of molten thermoplastic material onto a large diameter core drum having a winding surface of about 24 inches in diameter or greater to form a sleeve whereby adjacent windings in said sleeve are fused and upon being cooled a solid large diameter pipe connector is formed, said core drum having an inflated bladder attached thereto which forms said winding surface thereof;

(c) embedding at least one electric resistance heating wire within and adjacent a surface of said sleeve while said thermoplastic material is in the molten state;

(d) allowing said thermoplastic material to cool whereby a solid large diameter sleeve pipe connector is formed; and (e) removing said cooled solid large diameter sleeve pipe connector with said electrical resistance heating wire embedded therein from said core drum.

2. The method of claim 1 wherein said electric resistance heating wire is placed on said core drum prior to winding said tape of thermoplastic material thereon whereby said wire is embedded in the internal surface of said sleeve.

3. The method of claim 1 wherein said electric resistance heating wire is wound onto the external surface of said sleeve while said thermoplastic material is in the molten state whereby said wire is embedded in the external surface thereof.

4. The method of claim 1 which is further characterized to include the step of deflating said bladder prior to removing said sleeve from said core drum in accordance with step (e).

5. The method of claim 1 wherein said thermoplastic material is comprised of a polyolefin resin.

* * * * *